United States Patent
Ishida

(10) Patent No.: US 9,510,660 B2
(45) Date of Patent: Dec. 6, 2016

(54) COIL SPRING FOR COSMETIC MATERIAL AND COSMETIC CONTAINER

(71) Applicant: TOKIWA CORPORATION, Gifu (JP)

(72) Inventor: Yukikazu Ishida, Saitama (JP)

(73) Assignee: TOKIWA CORPORATION, Gifu (JP)

( * ) Notice: Subject to any disclaimer, the term of this patent is extended or adjusted under 35 U.S.C. 154(b) by 146 days.

(21) Appl. No.: 14/309,289

(22) Filed: Jun. 19, 2014

(65) Prior Publication Data
US 2015/0023713 A1 Jan. 22, 2015

(30) Foreign Application Priority Data
Jul. 18, 2013 (JP) .................................. 2013-149159

(51) Int. Cl.
| | |
|---|---|
| A45D 40/12 | (2006.01) |
| A45D 34/04 | (2006.01) |
| A45D 40/06 | (2006.01) |
| A45D 40/26 | (2006.01) |
| F16F 1/02 | (2006.01) |
| F16F 1/06 | (2006.01) |

(Continued)

(52) U.S. Cl.
CPC .............. *A45D 40/12* (2013.01); *A45D 34/042* (2013.01); *A45D 40/04* (2013.01); *A45D 40/06* (2013.01); *A45D 40/20* (2013.01); *A45D 40/205* (2013.01); *A45D 40/262* (2013.01); *F16F 1/021* (2013.01); *F16F 1/06* (2013.01); *A45D 2040/207* (2013.01)

(58) Field of Classification Search
CPC combination set(s) only.
See application file for complete search history.

(56) References Cited

U.S. PATENT DOCUMENTS 2,250,042 A * 7/1941 Sundt .................... H01R 13/562
16/108
2,586,646 A * 2/1952 Graham ................... B62D 7/16
267/180

(Continued)

FOREIGN PATENT DOCUMENTS

| DE | 10237955 A1 | 3/2004 |
|---|---|---|
| EP | 0970318 A1 | 1/2000 |

(Continued)

OTHER PUBLICATIONS

U.S. Appl. No. 14/263,333 to Yukikazu Ishida, filed Apr. 28, 2014.

(Continued)

*Primary Examiner* — David Walczak
(74) *Attorney, Agent, or Firm* — Greenblum & Bernstein, P.L.C.

(57) ABSTRACT

A coil spring for cosmetic material is a one spring where a first spring part and a second spring part whose winding wire diameters and spring constants differ from one another are continuously and integrally formed via a stepped part. Accordingly, the use of the first spring part and the second spring part allows, for example, achieving absorbing an impact in both directions of an axial direction and sequential movements of the components constituting the cosmetic container, thus allowing providing wide variety of functions with the one spring. For example, the use of the stepped part also allows locking the component constituting the cosmetic container.

8 Claims, 9 Drawing Sheets

(51) Int. Cl.
*A45D 40/04* (2006.01)
*A45D 40/20* (2006.01)

(56) References Cited

U.S. PATENT DOCUMENTS

| | | | |
|---|---|---|---|
| 4,077,619 A * | 3/1978 | Borlinghaus | F16F 1/08 |
| | | | 267/166 |
| 4,111,407 A * | 9/1978 | Stager | F16F 1/08 |
| | | | 267/166 |
| 4,438,397 A | 3/1984 | Katz | |
| 4,997,299 A | 3/1991 | Ohba | |
| 5,180,241 A | 1/1993 | Gueret | |
| 5,697,473 A * | 12/1997 | Lindner | F16D 55/28 |
| | | | 188/72.3 |
| 5,868,383 A | 2/1999 | Codos | |
| 7,055,812 B2 * | 6/2006 | Balsells | F16F 1/045 |
| | | | 267/166 |
| 7,284,926 B2 | 10/2007 | Tanaka et al. | |
| 2014/0064822 A1 | 3/2014 | Tani | |

FOREIGN PATENT DOCUMENTS

| | | |
|---|---|---|
| EP | 1512550 A1 | 3/2005 |
| FR | 2878699 A1 | 6/2006 |
| JP | S56-94272 A | 7/1981 |
| JP | H09-122566 A | 5/1997 |
| JP | 2012-096009 | 5/2012 |

OTHER PUBLICATIONS

Search Report issued in FRENCH family member Patent Appl. No. 1455927, dated Oct. 17, 2016.

* cited by examiner

COIL SPRING FOR COSMETIC MATERIAL AND COSMETIC CONTAINER

TECHNICAL FIELD

The present invention relates to a coil spring for cosmetic material and a cosmetic container that includes the coil spring for cosmetic material.

BACKGROUND ART

Conventionally, as a rod-shaped cosmetic material feeding container, there is known a technique described in the following Patent Document 1. The rod-shaped cosmetic material feeding container described in Patent Document 1 includes a front portion of a container, a rear portion of the container, a movable body, and a female screw member. The rear portion of the container is mounted rotatable with respect to the front portion of the container and immovable in an axial direction. The movable body is unrotatable around the axis line and movable in the axial direction with respect to the front portion of the container. The movable body supports a rod-shaped cosmetic material at the tip end and includes a male screw at the outer peripheral part. The female screw member is unrotatable with respect to the rear portion of a container around the axis line. The female screw member includes female screws at the inner peripheral part. The female screw is screwed with the male screw. When the front portion of the container rotates relative to the rear portion of the container, a screw part constituted of the male screw and the female screws acts. This advances and retreats the movable body, thus the rod-shaped cosmetic material appears and disappears from an opening at the tip end of the container.

In particular, with the rod-shaped cosmetic material feeding container, the female screw member includes female screws and a spring part (a second spring part) from the front side to the rear side in this order. The spring part can be expanded and contracted in the axial direction. Moreover, movement of the rear end of the spring part in the axial direction is almost blocked. Accordingly, even if an impact acts on the female screw member in any of back and forth directions in the axial direction due to, for example, a drop, the spring part retracts by shrinking or stretches (expands and contracts) in the axial direction. Accordingly, the female screws also move back and forth in the axial direction. Accordingly, the movable body, which includes the male screw screwed with the female screws, also moves back and forth. Consequently, it is considered that an impact to the rod-shaped cosmetic material can be absorbed, and can protect the rod-shaped cosmetic material.

CITATION LIST

Patent Literature

Patent Document 1: Japanese Unexamined Patent Application Publication No 2012-96009

SUMMARY OF THE INVENTION

Problems to be Solved by the Invention

Here, as described above, with the rod-shaped cosmetic material feeding container, if an impact acts on the female screw member in the axial direction (rearward or frontward direction), the spring part retracts by shrinking or stretches to absorb this impact. However, to restore the original shape after the retraction by shrinking or stretch, the spring part stretches or retracts by shrinking lively in the opposite direction to the axial direction. Therefore, the impact due to the restoring force acts on the rod-shaped cosmetic material again. Accordingly, one spring part can absorb only the impact in one direction of the axial direction. Thus, the one spring part can absorb only the impact in the one axial direction. That is, the one spring part can achieve just one function. Recently, one spring has been demanded to provide wide variety of functions.

Consequently, an object of the present invention is to provide a coil spring for cosmetic material that can provide wide variety of functions with one spring and a cosmetic container including the coil spring for cosmetic material.

Solutions to the Problems

A coil spring for cosmetic material according to the present invention is a coil spring used for a cosmetic container. The coil spring for cosmetic material includes a first spring part and a second spring part. The first spring part and the second spring part are integrally formed extending along an axial direction. The first spring part and the second spring part have different spring constants. The first spring part and the second spring part have different winding wire diameters. The first spring part and the second spring part are continuous via a stepped part.

According to the coil spring for cosmetic material, the coil spring for cosmetic material is a one spring where the first spring part and the second spring part whose winding wire diameters and spring constants differ from one another are continuously and integrally formed via the stepped part. Accordingly, the use of the first spring part and the second spring part allows, for example, achieving absorbing the impact in both directions of the axial direction and sequential movements of the components constituting the cosmetic container, thus allowing providing wide variety of functions with the one spring. For example, the use of the stepped part also allows easily locking the component constituting the cosmetic container.

Here, the following specifically describes a constitution that preferably provides the effects. The first spring part and the second spring part are arranged so as to surround a component constituting the cosmetic container. A spring part with a large winding wire diameter includes a concave part with small winding wire diameter at a part close to a stepped part. A lock part is formed between an end part at a stepped part side of a spring part with a small winding wire diameter and the concave part of a spring part with a large winding wire diameter. The lock part is configured to lock the convex part disposed at an outer peripheral surface of the component in an axial direction. This lock part allows the coil spring for cosmetic material to be easily locked to the component constituting the cosmetic container.

The following specifically describes a constitution that preferably provides the effects. A spring constant of a spring part with a large winding wire diameter is larger than a spring constant of a spring part with a small winding wire diameter by configuring a winding pitch of the spring part with a large winding wire diameter larger than a winding pitch of the spring part with small winding wire diameter. Here, the spring constant of the spring part with a large winding wire diameter becomes smaller than the spring constant of the spring part with small winding wire diameter. However, the use of the constitution of differentiating the pitches, the spring constant of the spring part with a large winding wire diameter can be larger than the spring constant of the spring part with small winding wire diameter.

A cosmetic container according to the present invention is configured as follows. The cosmetic container includes a tubular-shaped container, a movable body, a female screw member, and the above-described coil spring for cosmetic material. The tubular-shaped container includes a front portion of the container and a rear portion of the container. The rear portion of the container is mounted rotatable with respect to the front portion of the container around an axis line and immovable in an axial direction. The movable body includes a male screw at an outer peripheral part. The movable body is unrotatable around the axis line and movable in the axial direction with respect to the front portion of the container. The movable body supports a rod-shaped cosmetic material at a tip end. The female screw member includes a female screw at an inner peripheral part. The female screw part is unrotatable with respect to the rear portion of the container around the axis line. The female screw is screwed with the male screw. The male screw and the female screw constitute a screw part. The screw part acts by relative rotation of the front portion of the container and the rear portion of the container. The relative rotation advances and retreats the movable body to cause the rod-shaped cosmetic material to appear and disappear from an opening at a tip end of the container. The female screw member is movable in the axial direction. Any one of the first spring part or the second spring part of the coil spring for cosmetic material is configured to restrict movement in one direction of the axial direction of the female screw member. Another of the first spring part or the second spring part is configured to restrict movement in another direction of the axial direction of the female screw member.

According to the cosmetic container where the rod-shaped cosmetic material is supported to the tip end of the movable body and that includes the female screw member with the female screw screwed with the male screw of this movable body, the following can be achieved. Assume the case where an impact in one direction of the axial direction acts on the female screw member and the female screw member moves in the one direction of the axial direction. Any one of the first spring part or the second spring part restricts a movement of the female screw member in the one direction to absorb the impact. Afterwards, when any one of the first spring part or the second spring part restores an original shape, the other first spring part or the second spring part restricts a movement of the female screw member in the other direction (the opposite direction), thus absorbing the impact due to the restoring force. Accordingly, the one spring can absorb the impacts in both directions of the axial direction of the female screw member, allowing sufficiently protecting the rod-shaped cosmetic material supported to the tip end of the movable body. That is, the one spring can provide wide variety of functions.

A cosmetic container according to the present invention is configured as follows. The cosmetic container includes a tube body, a shaft body, an elastic tube, a tubular sleeve, a writing brush, and the above-described coil spring for cosmetic material. The tube body includes an opening at a tip end. The shaft body can advance and retreat in an axial direction inside the tube body. The elastic tube is disposed at a tip end of the tube body. The tubular sleeve is housed in the tube body and the elastic tube. The tubular sleeve can advance and retreat in the axial direction. The sleeve includes a tip end part and a lock part. The tip end part is positioned in the elastic tube. The lock part is disposed at an outer surface rear side with respect to the tip end part. The writing brush is disposed at a tip end of the shaft body. The writing brush passes an inside of the sleeve and an inside of the elastic tube, contacts a tip end of the elastic tube, and then projects outward. A spring part with a large spring constant is compressed between the shaft body and the lock part of the sleeve. A spring part with small spring constant is compressed between the lock part of the sleeve and the elastic tube. When the tip end part of the sleeve moves forward, the tip end part projects outward while sliding in contact with the tip end of the elastic tube.

With this cosmetic container, the first application aspect allows thin application using the tip end of the writing brush with the tip end side of the writing brush bundled at the tip end of the elastic tube in contact with the writing brush. In another application aspect, the forward movement of the shaft body causes the writing brush to move forward together with the shaft body. Simultaneously with this, force of the forward movement by the shaft body (the pressing force) is transmitted to the sleeve via the spring part with the large spring constant, which is disposed between the shaft body and the lock part of the sleeve. The sleeve moves forward while compressing the spring part with the small spring constant, which is disposed between the lock part of the sleeve and the elastic tube. The tip end part of the sleeve passes the tip end of the elastic tube and projects outward while sliding in contact with the tip end, thus positioning between the tip end of the elastic tube and the writing brush. That is, the writing brush moves forward together with the sleeve. At this time, the tip end part of the sleeve is interposed between the tip end of the elastic tube, which bundles the writing brush, and the writing brush. The sleeve protects the forward moving writing brush. Accordingly, the tip end of the elastic tube prevents the writing brush from being rolled and fallen apart. Then, when the compression of the spring part with the small spring constant nearly comes to an end, the spring part with the large spring constant compresses to move only the writing brush forward. Thus, in another application aspect, since the writing brush projects outward farther than the first application aspect, thick application mainly using the part other than the tip end of the writing brush is possible. Thus, the one spring can achieve sequential movements of the components constituting the cosmetic container, such as the sleeve and the writing brush. That is, the one coil spring can provide wide variety functions.

ADVANTAGEOUS EFFECTS OF THE INVENTION

Thus, according to the present invention, a coil spring for cosmetic material that can provide wide variety of functions with one spring and a cosmetic container including the coil spring for cosmetic material can be provided.

DESCRIPTION OF EMBODIMENTS

Embodiments of a coil spring for cosmetic material and a cosmetic container that includes the coil spring for cosmetic material according to the present invention will be described below with reference to FIG. 1 to FIG. 9. FIG. 1 to FIG. 5 illustrate a first embodiment of the present invention. FIG. 6 to FIG. 9 illustrate a second embodiment of the present invention.

First, the first embodiment, which is illustrated in FIG. 1 to FIG. 5, will be described.

Figure 1:
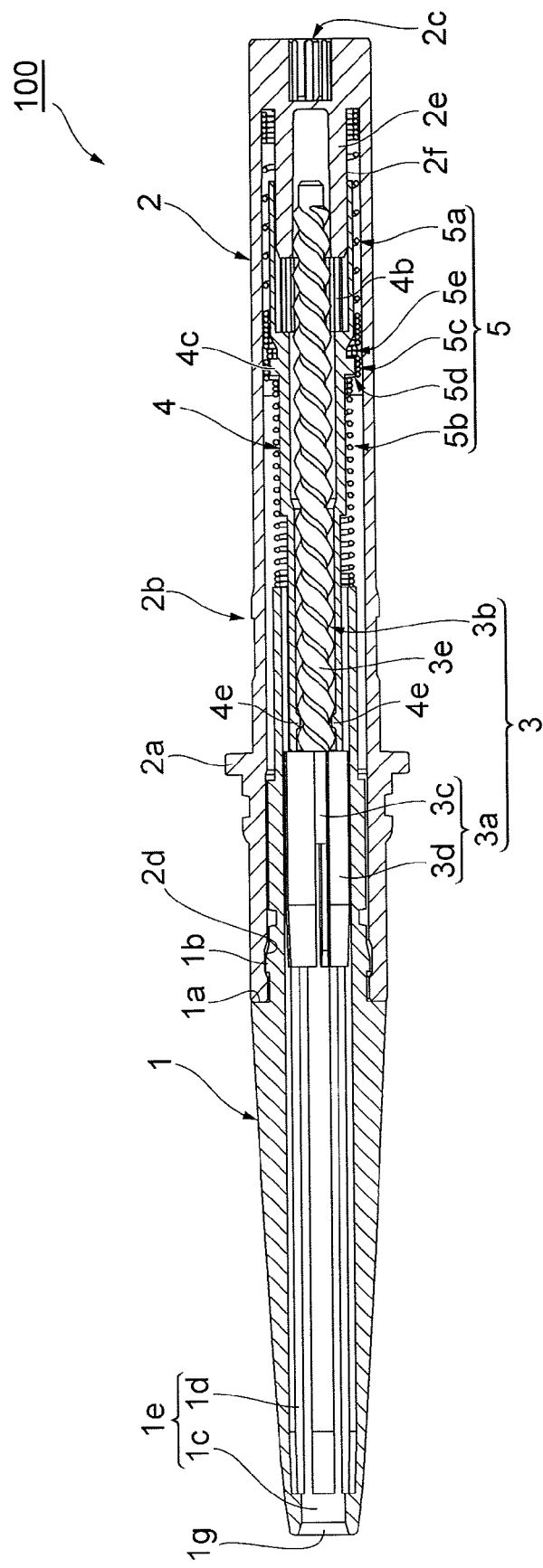
FIG. 1 is a longitudinal cross-sectional view illustrating a rod-shaped cosmetic material feeding container as a cosmetic container according to a first embodiment of the present invention.
Figure 2:
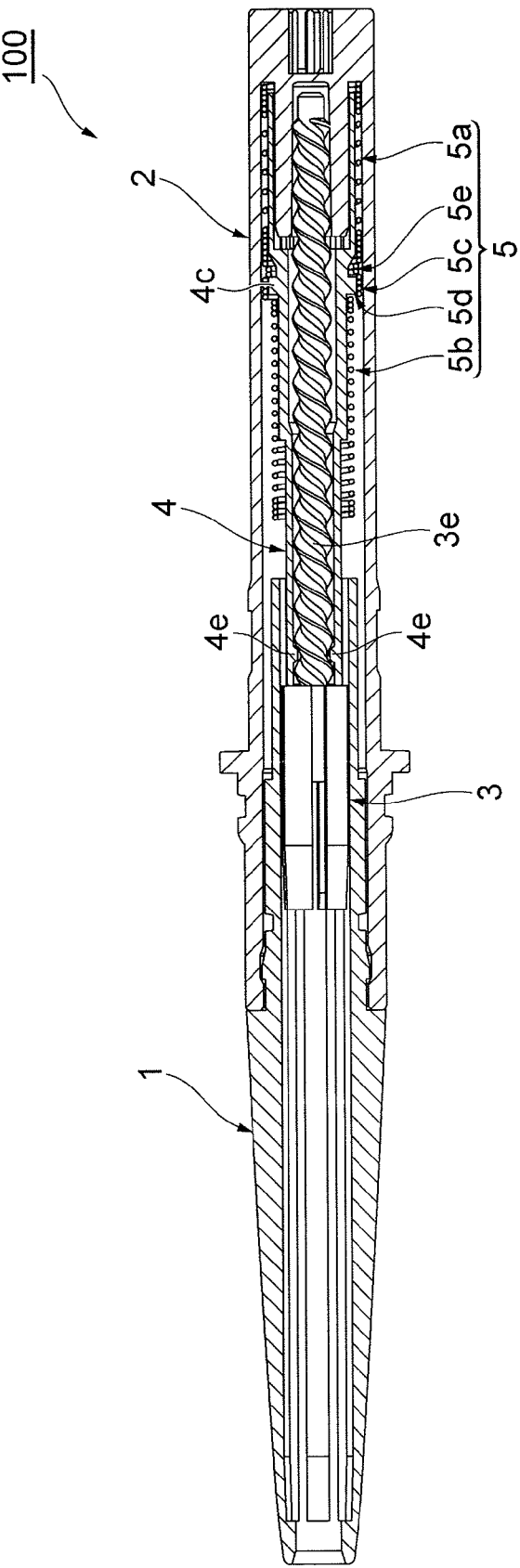
FIG. 2 is a longitudinal cross-sectional view illustrating a state where an impact is acted on a female screw member of the rod-shaped cosmetic material feeding container in FIG. 1 to rearward in the axial direction.
Figure 3:
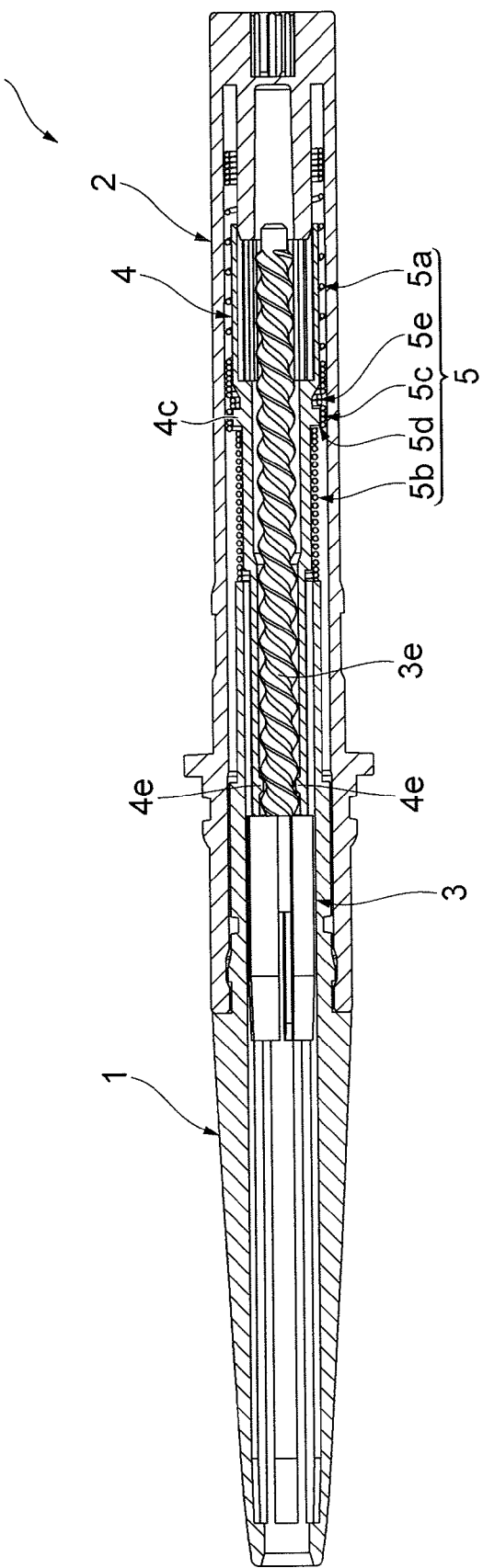
FIG. 3 is a longitudinal cross-sectional view illustrating a state where an impact is acted on the female screw member of the rod-shaped cosmetic material feeding container in FIG. 1 to frontward in the axial direction.
Figure 4:
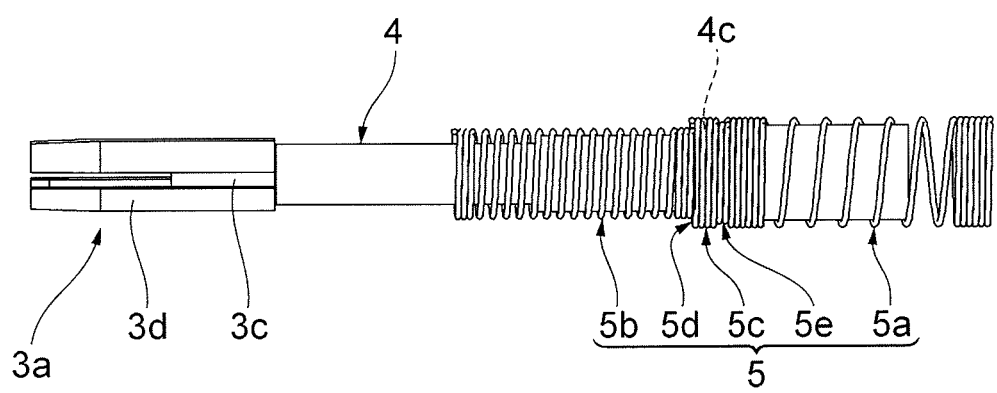
FIG. 4 is a side view illustrating a rod-shaped cosmetic material support body, coil springs, and the female screw member in FIG. 1.
Figure 5:
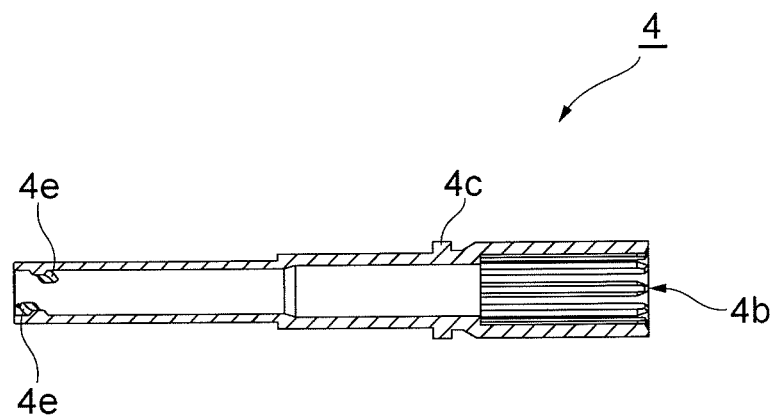
FIG. 5 is a longitudinal cross-sectional view of the female screw member in FIG. 4.

FIG. 1 is a longitudinal cross-sectional view illustrating a rod-shaped cosmetic material feeding container as a cosmetic container according to a first embodiment. FIG. 2 is a longitudinal cross-sectional view illustrating a state where an impact is acted on a female screw member of the rod-shaped cosmetic material feeding container to rearward in the axial direction. FIG. 3 is a longitudinal cross-sectional view illustrating a state where an impact is acted on the female screw member of the rod-shaped cosmetic material feeding container to frontward in the axial direction. FIG. 4 is a side view illustrating a rod-shaped cosmetic material support body, coil springs, and the female screw member. FIG. 5 is a longitudinal cross-sectional view of the female screw member. The rod-shaped cosmetic material feeding container of this embodiment houses, for example, various rod-shaped cosmetic materials such as an eye liner, an eyebrow, a lip liner, and a concealer. A user can appropriately cause the cosmetic material to appear and disappear as needed. To avoid complexity of the drawings, the drawings omit a cap that covers the rod-shaped cosmetic material and a tip end of the container.

As illustrated in FIG. 1, a rod-shaped cosmetic material feeding container 100 is referred to as a so-called rod-shaped cosmetic material cartridge. The rod-shaped cosmetic material feeding container 100 has a rounded bar shape whose overall shape is elongate like a writing material. The rod-shaped cosmetic material feeding container 100 is mounted to be removably attachable (or undetachably) at one end side of a cartridge accommodating container (not illustrated) for use.

The rod-shaped cosmetic material feeding container 100 is a tubular-shaped container that includes a leading tube 1 and a main body tube 2. The leading tube 1 constitutes a front portion of the container. The main body tube 2 constitutes a rear portion of the container. The leading tube 1 and the main body tube 2 internally house a rod-shaped cosmetic material, a rod-shaped cosmetic material support body 3, a female screw member 4, and further a coil spring for cosmetic material (a coil spring) 5 as a shock-absorbing member. The rod-shaped cosmetic material support body 3 is a movable body that supports the rod-shaped cosmetic material. The female screw member 4 constitutes a screw part (a screw engagement mechanism).

The main body tube 2 has a closed-bottomed cylindrical shape. A rear side with respect to a flange part 2a, which is disposed at an outer peripheral surface, becomes an interpolation part to be inward inserted to the cartridge accommodating container. In the outer peripheral surface at the rear side with respect to the flange part 2a, a concavo-convex part 2b is disposed. The concavo-convex part 2b includes an annular-shaped concave part and a convex part. The concave part and the convex part are arranged side by side in this order toward rearward in the axial direction. The concavo-convex part 2b causes the main body tube 2 to engage the cartridge accommodating container in the axial direction. The main body tube 2 includes a concave part at the rear end surface. The concave part has a circular shape in cross section and is depressed to the tip end side. A knurling 2c is disposed at the inner peripheral surface of the concave part. The knurling 2c includes unevennesses densely arranged side by side along the circumferential direction. The knurling 2c extends in the axial direction at a predetermined length. The knurling 2c engages the cartridge accommodating container in the rotation direction. In the inner peripheral surface at the front side with respect to the flange part 2a of the main body tube 2, an annular-shaped concave part 2d is disposed. The concave part 2d engages the leading tube 1 in the axial direction. In the inner surface of the bottom part of the main body tube 2, a cylindrically-shaped projecting part 2e is disposed. The projecting part 2e projects to the tip end side. A knurling 2f is disposed at the outer peripheral surface of the projecting part 2e. The knurling 2f includes unevennesses densely arranged side by side along the circumferential direction. The knurling 2f extends in the axial direction at a predetermined length. The knurling 2f engages the female screw member 4 in the rotation direction.

As illustrated in FIG. 5, the female screw member 4 is constituted to have a stepped cylindrical shape. The female screw member 4 includes a pair of screw projections 4e at the tip end sides of the inner peripheral surface. The pair of screw projections 4e function as a female screw that constitutes one of a screw part. The female screw member 4 also includes a knurling 4b at the rear part side of the inner peripheral surface. The knurling 4b engages the knurling 2f of the main body tube 2 in the rotation direction.

An annular-shaped convex part 4c is disposed at the outer peripheral surface of the female screw member 4 at a rear side position with respect to the middle of the axial direction. The convex part 4c locks the coil spring 5 (details will be described later).

The female screw member 4 is inward inserted to the tip end side of the main body tube 2 from the rear end part of the female screw member 4 as illustrated in FIG. 1. The knurling 4b engages the knurling 2f of the main body tube 2 in the rotation direction. Thus, the female screw member 4 is mounted unrotatably with respect to the main body tube 2 around the axis line and movable in the axial direction (synchronously rotatable).

The leading tube 1 is constituted to have a stepped cylindrical shape with a stepped part 1a at the middle of the outer peripheral surface in the axial direction. A cylinder part with a small diameter continuous from the stepped part 1a to the rear side serves as the interpolation part inward inserted to the main body tube 2. A cylinder part with a large diameter continuous from the stepped part 1a to the front side and is tapered off to the tip end becomes a knob that projects from the tip end of the main body tube 2 and pinched by the user. At the outer peripheral surface at the rear side with respect to the stepped part 1a of the leading tube 1, an annular-shaped convex part 1b is disposed. The convex part 1b engages the annular-shaped concave part 2d of the main body tube 2 in the axial direction.

The leading tube 1 includes a rod-shaped cosmetic material hole 1c, a support piece groove 1d, and an advancing-retreating hole 1e. The rod-shaped cosmetic material hole 1c passes through from an opening 1g at the tip end to the rear end to allow the rod-shaped cosmetic material to slide. The support piece groove 1d houses a support piece 3d of the rod-shaped cosmetic material support body 3, which will be described later, at a plurality of positions (here, four uniformly arranged positions) around the rod-shaped cosmetic material hole 1c across from near the opening 1g to the rear end to allow sliding. The support piece groove 1d is installed consecutively to the rod-shaped cosmetic material hole 1c. The rod-shaped cosmetic material hole 1c and the support piece groove 1d constitute the advancing-retreating hole 1e where the rod-shaped cosmetic material and the support piece 3d slide.

The leading tube 1 is inward inserted from the interpolation part to the tip end side of the main body tube 2. The stepped part 1a bumps into a top end surface of the main body tube 2. The convex part 1b engages the concave part 2d of the main body tube 2 in the axial direction. Thus, the leading tube 1 is mounted rotatable around the axis line and immovable in the axial direction with respect to the main body tube 2. In view of this, the leading tube 1 is also rotatable with respect to the female screw member 4 around the axis line.

The rod-shaped cosmetic material support body 3 includes a support part 3a and a shaft body part 3b. The support part 3a supports the rear end part of the rod-shaped cosmetic material. The shaft body part 3b is disposed at the rear side with respect to the support part 3a. The shaft body part 3b is a shaft body extending in the axial direction and includes a male screw 3e at the outer peripheral surface. The male screw 3e constitutes the other side of the screw part and extends in the axial direction. The support part 3a includes a base part 3c and support pieces 3d. The base part 3c has an outer shape approximately matches the outer shape of the rod-shaped cosmetic material. The rear end surface of the rod-shaped cosmetic material is bumped into the base part 3c. The support pieces 3d are disposed at a plurality of positions (here, four uniformly arranged positions) at the outer peripheral surface of the base part 3c in the circumferential direction and project toward the tip end side. The support pieces 3d sandwich the rear end part of the rod-shaped cosmetic material bumped into the base part 3c between them for support.

The rod-shaped cosmetic material support body 3 is inward inserted from the tip end side to the rear end side of the leading tube 1. The base part 3c advances the rod-shaped cosmetic material hole 1c of the leading tube 1. The support piece 3d advances the support piece groove 1d of the leading tube 1. Thus, the rod-shaped cosmetic material support body 3 is inward inserted to the advancing-retreating hole 1e. Accordingly, the support piece groove 1d to which the support piece 3d of the rod-shaped cosmetic material support body 3 advances serves as a rotation stopper for the rod-shaped cosmetic material support body 3. The rod-shaped cosmetic material support body 3 is mounted unrotatably around the axis line and movable in the axial direction with respect to the leading tube 1. In this state, the shaft body part 3b of the rod-shaped cosmetic material support body 3 enters the inside of the female screw member 4. Thus, the male screw 3e threadably mounted on the screw projection 4e of the female screw member 4.

The coil spring 5 is a compression coil spring. Here, the coil spring 5 is made of SUS. As illustrated in FIG. 1 and FIG. 4, the coil spring 5 is disposed so as to surround (wind around) the female screw member 4, which is a component for constituting the cosmetic container 100.

This coil spring 5 is an integrally molded product in which a front half portion 5b is integrally continuous with a rear half portion 5a via a stepped part 5d. The rear half portion 5a has a large winding wire diameter (a coil diameter). The front half portion 5b has a small winding wire diameter. Here, the rear half portion, which has a large winding wire diameter, is configured as a first coil spring (a first spring part) 5a and the front half portion, which has a small winding wire diameter, is configured as a second coil spring (a second spring part) 5b.

Here, according to the Hooke's law, a spring constant of the spring part with a large winding wire diameter becomes smaller than the spring constant of the spring part with small winding wire diameter. However, in this embodiment, a winding pitch of the first coil spring 5a with a large winding wire diameter is configured to be larger than the winding pitch of the second coil spring 5b with small winding wire diameter (the first coil spring 5a is roughly wound while the second coil spring 5b is densely wound). Accordingly, the spring constant of the first coil spring 5a with a large winding wire diameter is devised to be larger than the spring constant of the second coil spring 5b with small winding wire diameter. That is, the first coil spring 5a is hard to be expanded and contracted while the second coil spring 5b features flexible expansion and contraction compared with the first coil spring 5a.

At a part close to the stepped part 5d at the first coil spring 5a, which has the large winding wire diameter, an annular-shaped concave part 5e with small winding wire diameter is formed. A lock part 5c is formed between an end part at the stepped part 5d side of the second coil spring 5b with the small winding wire diameter and the concave part 5e of the first coil spring 5a with the large winding wire diameter. The lock part 5c locks the convex part 4c of the female screw member 4 in the axial direction.

The coil spring 5 thus constituted is arranged so as to wind around the female screw member 4. Therefore, the lock part 5c of the coil spring 5 is opposed to (abuts on) the respective front side surface and rear side surface of the convex part 4c of the female screw member 4 in the axial direction. Accordingly, the lock part 5c of the coil spring 5 is locked with respect to the convex part 4c of the female screw member 4 in the axial direction.

As illustrated in FIG. 1, in the state where the rod-shaped cosmetic material support body 3 positions at a retreating limit, which is an initial position, the rear end surface of the leading tube 1 and the bottom part of the main body tube 2 sandwich the coil spring 5. Thus, both the first coil spring 5a and the second coil spring 5b accumulate resilient force. Therefore, the first coil spring 5a functions to reduce movement of the female screw member 4 rearward in the axial direction. The second coil spring 5b functions to reduce movement of the female screw member 4 frontward in the axial direction. In the state where the rod-shaped cosmetic material support body 3 thus positions at the retreating limit, which is the initial position, the rear end surface of the base part 3c of the rod-shaped cosmetic material support body 3 abuts on the top end surface of the female screw member 4.

The interpolation part of the rod-shaped cosmetic material feeding container (the rod-shaped cosmetic material cartridge) 100 thus constituted is inward inserted to the opening at the one end side of the cartridge accommodating container. The flange part 2a of the main body tube 2 abuts on the end surface at the one end side of the cartridge accommodating container. The concavo-convex part 2b of the main body tube 2 engages the concavo-convex part (not illustrated) at the inner peripheral surface of the cartridge accommodating container in the axial direction. This causes the rod-shaped cosmetic material feeding container 100 removably attachable or undetachable with respect to the cartridge accommodating container in the axial direction. The knurling 2c of the main body tube 2 engages the knurling (not illustrated) of the cartridge accommodating container in the rotation direction. This allows the rod-shaped cosmetic material feeding container 100 to be unrotatably mounted with respect to the cartridge accommodating container around the axis line. That is, the rod-shaped cosmetic material cartridge 100 and the cartridge accommodating container are integrated.

Next, the following describes an act of the rod-shaped cosmetic material feeding container 100 with such constitution. When the user relatively rotates the leading tube 1, which constitutes the front portion of the container, and the cartridge accommodating container, which constitutes the rear portion of a container, in a feed direction, which is a one direction, a screwing effect of the screw part, which is formed by the male screw 3e of the rod-shaped cosmetic material support body 3 and the screw projection 4e of the female screw member 4, acts. This moves the rod-shaped cosmetic material support body 3 forward. Then, the rod-shaped cosmetic material appears from the opening 1g at the tip end of the leading tube 1, allowing the rod-shaped cosmetic material to be used for application. Then, the first coil spring 5a, which has the large spring constant, absorbs impact acting on the rod-shaped cosmetic material in the axial direction due to pressure of applying the cosmetic material.

When the user terminates the application and relatively rotates the leading tube 1 and the cartridge accommodating container in a feedback direction, which is the opposite direction to the one direction. This retreats the rod-shaped cosmetic material support body 3 and the rod-shaped cosmetic material sinks from the opening 1g at the tip end of the leading tube 1.

Here, the description is given with the state where the rod-shaped cosmetic material feeding container 100 is mounted to the cartridge accommodating container as the rod-shaped cosmetic material cartridge. To cause the rod-shaped cosmetic material to appear and disappear from the opening 1g of the leading tube 1 with the state where the rod-shaped cosmetic material feeding container 100 is removed from the cartridge accommodating container, it is only necessary to relatively rotate the leading tube 1, which constitutes the front portion of the container, and the main body tube 2, which constitutes the rear portion of the container, in the feed direction or the feedback direction.

Here, assume the case where the rod-shaped cosmetic material feeding container 100, for example, drops from the tip end side with the rod-shaped cosmetic material feeding container 100 mounted to the cartridge accommodating container or removed from the cartridge accommodating container. As illustrated in FIG. 3, this impact first moves the female screw member 4 frontward in the axial direction. Then, an impact acts on the female screw member 4 rearward in the axial direction. As illustrated in FIG. 2, the female screw member 4 moves rearward in the axial direction.

In association with the movement of the female screw member 4 in the axial direction, the second coil spring 5b restricts the frontward movement of the female screw member 4 and absorbs (buffers) the impact. Afterwards, when the second coil spring 5b restores (returns to) the original shape, the first coil spring 5a restricts the rearward movement of the female screw member 4 and absorbs the impact (vibration) due to the restoring force.

Assume the case where the rod-shaped cosmetic material feeding container 100, for example, drops from the rear end side with the rod-shaped cosmetic material feeding container 100 mounted to the cartridge accommodating container or removed from the cartridge accommodating container. As illustrated in FIG. 2, this impact first moves the female screw member 4 rearward in the axial direction. Then, an impact acts on the female screw member 4 frontward in the axial direction. As illustrated in FIG. 3, the female screw member 4 moves frontward in the axial direction.

In association with the movement of the female screw member 4 in the axial direction, the first coil spring 5a restricts the rearward movement of the female screw member 4 and absorbs (buffers) the impact. Afterwards, when the first coil spring 5a restores (returns to) the original shape, the second coil spring 5b restricts the frontward movement of the female screw member 4 and absorbs the impact (vibration) due to the restoring force.

Thus, this embodiment configures one spring, the coil spring 5, where the first coil spring 5a and the second coil spring 5b whose winding wire diameters and spring constants differ from one another are continuously and integrally formed via the stepped part 5d. Accordingly, the use of the first coil spring 5a and the second coil spring 5b allows achieving absorbing the impact in both directions of the axial direction, thus allowing providing wide variety of functions with the one spring.

Specifically, assume the case where an impact in one direction of the axial direction acts on the female screw member 4 with the female screw (the screw projection) 4e screwed with the male screw 3e of the rod-shaped cosmetic material support body 3, which is the movable body, and this moves the female screw member 4 in the one direction of the axial direction. Any one of the first coil spring 5a or the second coil spring 5b restricts a movement of the female screw member 4 in the one direction to absorb the impact. Afterwards, when any one of the first coil spring 5a or the second coil spring 5b restores an original shape, the other first coil spring 5a or the second coil spring 5b restricts a movement of the female screw member 4 in the other direction (the opposite direction), thus absorbing the impact due to the restoring force. Accordingly, the one coil spring 5 can absorb the impacts in both directions of the axial direction of the female screw member 4, allowing sufficiently protecting the rod-shaped cosmetic material supported to the tip end of the rod-shaped cosmetic material support body 3. That is, the one coil spring 5 can provide wide variety of functions.

In this embodiment, the use of the stepped part 5d also allows easily locking the component constituting the cosmetic container. Specifically, the lock part 5c is formed between the end part at the stepped part 5d side of the second coil spring 5*b* with the small winding wire diameter and the concave part 5*e* of the first coil spring 5*a* with the large winding wire diameter. The lock part 5*c* locks the convex part 4*c* of the female screw member 4 in the axial direction. This lock part 5*c* allows easily locking the coil spring 5 to the female screw member 4.

Both ends of the coil spring 5 are not secured to the main body tube 2 and the leading tube 1 here; however, both ends may be secured.

Further, in the first embodiment, an application to a cartridge type cosmetic container is described. However, application to a cosmetic container other than the cartridge type cosmetic container is also possible.

Figure 6:
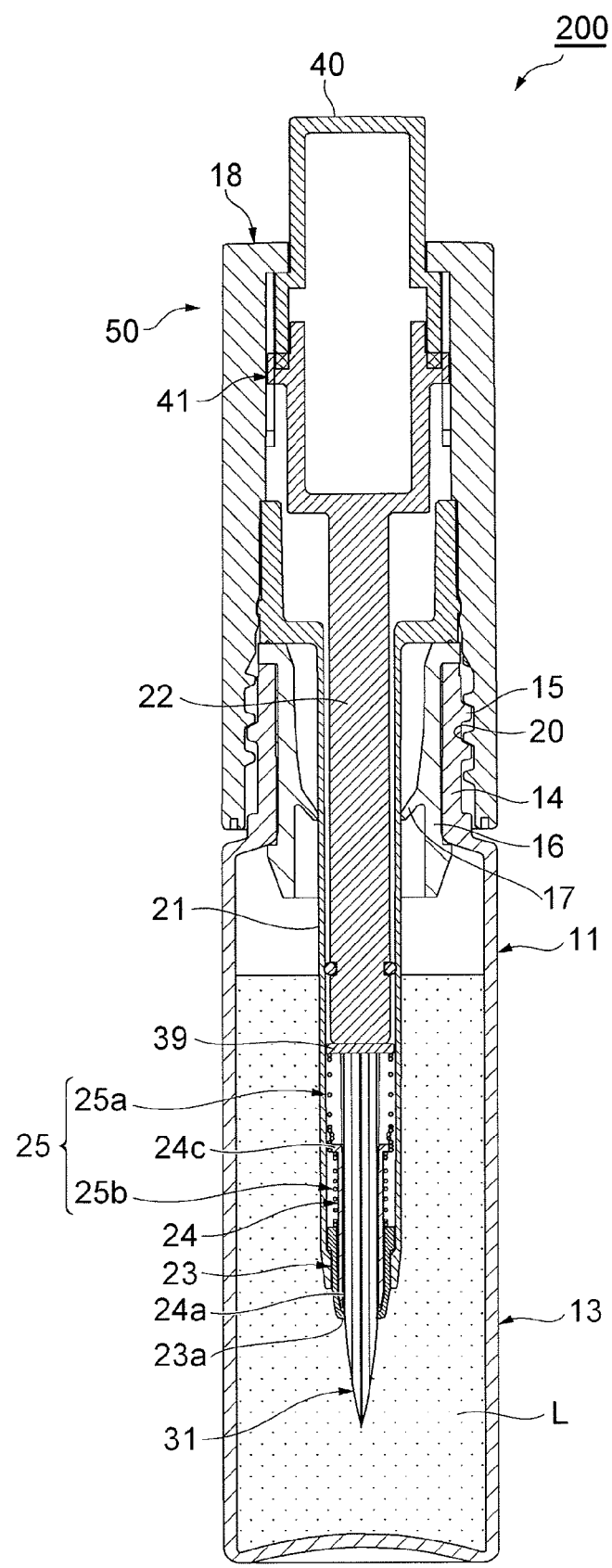
FIG. 6 is a longitudinal cross-sectional view illustrating a cosmetic container according to a second embodiment of the present invention.
Figure 7:
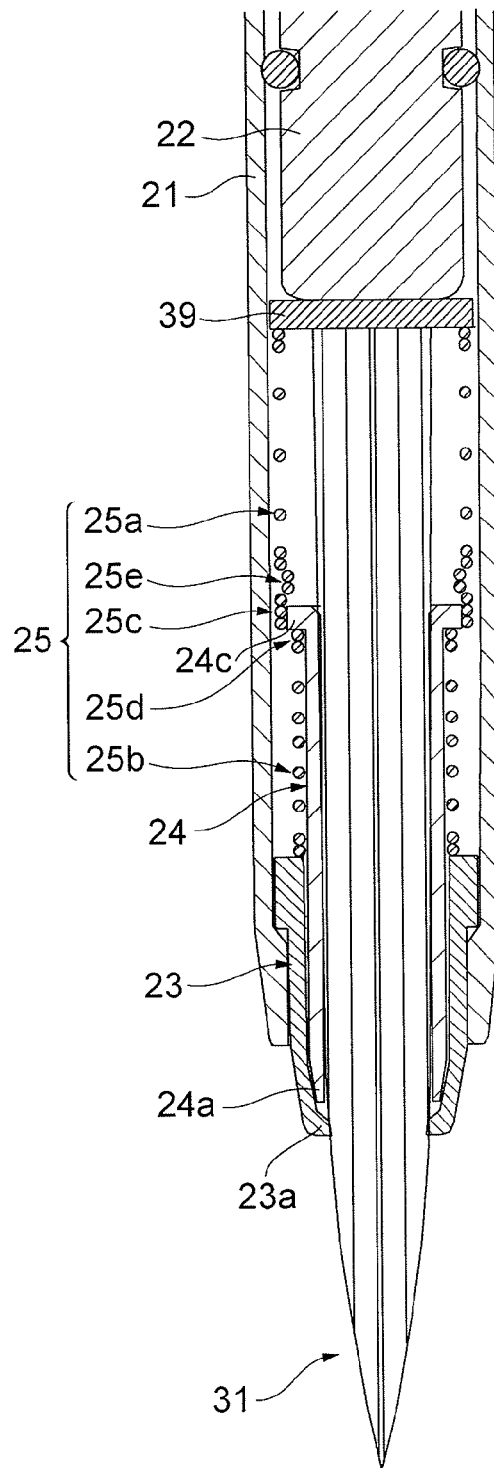
FIG. 7 is a longitudinal cross-sectional view illustrating an enlarged leading-end-side cosmetic material applicator in FIG. 6.
Figure 8:
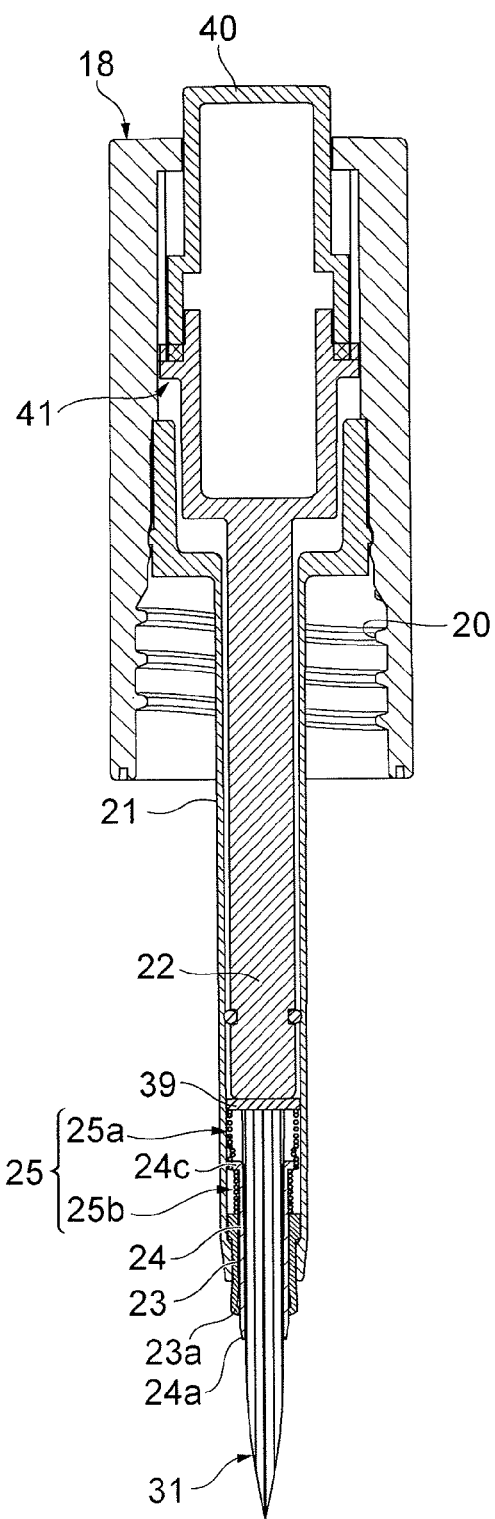
FIG. 8 is a longitudinal cross-sectional view illustrating a state where the cosmetic material applicator in FIG. 6 is extracted from a container main body and a knock operation is performed on an operating unit to move a writing brush forward.
Figure 9:
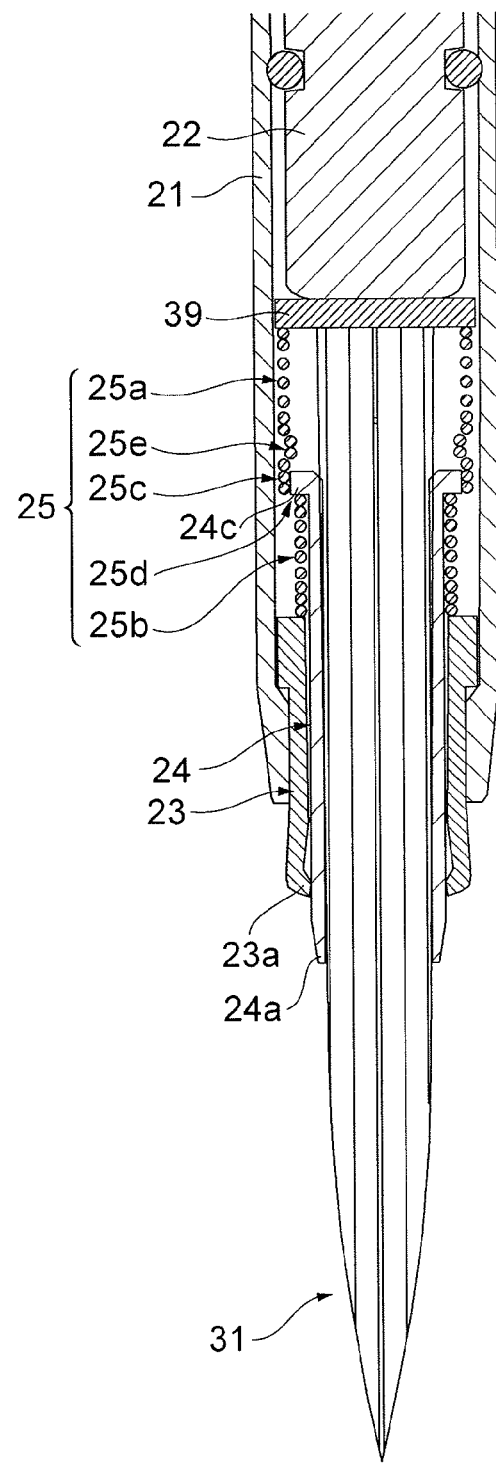
FIG. 9 is a longitudinal cross-sectional view illustrating an enlarged leading-end-side cosmetic material applicator in FIG. 8.

FIG. 6 is a longitudinal cross-sectional view illustrating a cosmetic container according to a second embodiment of the present invention. FIG. 7 is a longitudinal cross-sectional view illustrating an enlarged leading-end-side cosmetic material applicator in FIG. 6. FIG. 8 is a longitudinal cross-sectional view illustrating a state where the cosmetic material applicator in FIG. 6 is extracted from a container main body and a knock operation is performed on an operating unit to move a writing brush forward. FIG. 9 is a longitudinal cross-sectional view illustrating an enlarged leading-end-side cosmetic material applicator in FIG. 8. The cosmetic container of this embodiment is employed for application of a liquid cosmetic material on an application target part with a writing brush.

As illustrated in FIG. 6, a cosmetic container 200 is a bottle-shaped cosmetic container. The cosmetic container 200 roughly includes a container main body 11, a lid (a cap) of the container main body 11, and a cosmetic material applicator 50. The container main body 11 houses a liquid cosmetic material L. The lid is attachably/removably mounted to the container main body 11. The cosmetic material applicator 50 functions as an applicator of the liquid cosmetic material L.

The container main body 11 includes a housing part 13 and an opening neck part 14. The housing part 13 houses the liquid cosmetic material L. The opening neck part 14 is integrally installed consecutive to the upper part of the housing part 13 so as to be coupled to the housing part 13.

The housing part 13 has a closed-bottomed cylindrical shape. The housing part 13 internally houses the liquid cosmetic material L. The opening neck part 14 is a small-diameter cylinder part installed consecutive to the upper part of the housing part 13. The inside of the cylinder communicates with the inside of the housing part 13. The opening neck part 14 is provided with a male screw 15 at the outer peripheral surface. The male screw 15 threadably mounts the cosmetic material applicator 50 so as to be removably attachable. A cylindrically-shaped middle plug part 16 made of, for example, a plastic and rubber is fixedly secured to the inner peripheral surface of the opening neck part 14. This middle plug part 16 is provided with a scraping part 17 at the inner peripheral surface. When a tube body 21, which will be described later, of the cosmetic material applicator 50 passes, the scraping part 17 scrapes off the extra liquid cosmetic material L attached to the outer peripheral surface of the tube body 21.

The cosmetic material applicator 50 roughly includes a grip part 18, an operating unit 40, the tube body 21, a shaft body 22, an elastic tube 23, a sleeve 24, a writing brush 31, and a coil spring for cosmetic material (a coil spring) 25. The grip part 18 serves as a lid of the container main body 11 and is gripped by the user. The operating unit 40 is disposed at the grip part 18 and is knocked by the user. The tube body 21 extends downward from the grip part 18. The shaft body 22 vertically extends and can advance and retreat in the axial direction in the tube body 21 by the knock operation. The elastic tube 23 is disposed at the tip end side of the tube body 21. The sleeve 24 is housed in the tube body 21 and the elastic tube 23. The sleeve 24 is housed in the tube body 21 and the elastic tube 23. The sleeve 24 can advance and retreat in the axial direction (the vertical direction). The writing brush 31 is mounted to a tip end of the shaft body 22. The writing brush 31 passes through the inside of the sleeve 24 and the inside of the elastic tube 23 and then projects outward. The coil spring 25 is housed in the tube body 21 and acts on the sleeve 24 and the writing brush 31.

The grip part 18 has the closed-bottomed cylindrical shape whose closed bottom part is located at the upper side. The grip part 18 is provided with a female screw 20 at the inner peripheral surface at the opening end side. The female screw 20 is screwed with the male screw 15, which is at the outer peripheral surface of the opening neck part 14. Screwing the female screw 20 with the male screw 15 causes the grip part 18 to be attachably/removably mounted to the container main body 11.

The operating unit 40 has a pin shape. The operating unit 40 passes through the closed bottom part, which is the upper wall of the grip part 18 inside and outside, and projects from the upper wall at the predetermined length so as to allow the knock operation by the user.

The tube body 21 has a cylindrical shape forming an outer tube. The upper end of the tube body 21 is fitted into the inside of the grip part 18 and the lower end extends toward the bottom part of the housing part 13 of the container main body 11.

The shaft body 22 has a columnar shape extending in the vertical direction. The upper side of the shaft body 22 is coupled to the operating unit 40 via an advancing-retreating lock mechanism 41 and the lower part from the upper side is housed in the tube body 21.

The advancing-retreating lock mechanism 41 is the following well-known mechanism. By a pressing operation, the knock operation of the operating unit 40 by the user, the advancing-retreating lock mechanism 41 moves a rotor forward in the axial direction along an inner piece, circumferentially rotates the rotor, and locks the rotor. This moves the shaft body 22 forward and locks the shaft body 22. Meanwhile, the re-knock operation releases the locked state and retreats the rotor in the axial direction along the inner piece to retreat the shaft body 22 to the original position.

The elastic tube 23 has a cylindrical shape made of an elastic body such as a rubber. As illustrated in FIG. 7, the elastic tube 23 is fixedly secured to the inner circumferential surface of the tip end part of the tube body 21. The elastic tube 23 projects from the tip end of the tube body 21 outward at the predetermined length. A tip end 23*a* of the elastic tube 23 annularly projects out toward the inside (toward the axial direction). The writing brush 31 passes through the circular opening formed by the projection. A thick-diameter part (a rear side part with respect to the tip end part) of the writing brush 31 contacts (abuts on) the tip end 23*a* of the elastic tube 23.

The sleeve 24 has a cylindrical shape and is provided with a flange part (a lock part) 24*c* at the upper end. The flange part 24*c* annularly projects out toward radially outward. The upper half part of the sleeve 24 is housed in the tube body 21. The lower half part of the sleeve 24 including a tip end part 24*a* is housed in the elastic tube 23. The tip end part 24*a* of the sleeve 24 is arranged at a position close to a back surface (the top surface in the drawing) of the tip end 23*a* of the elastic tube 23.

The writing brush 31 is fixedly secured to a lower end surface of a shaft body plate 39 and extends downward. The top end surface of the shaft body plate 39 is secured to the tip end of the shaft body 22 by being pressed with the coil spring 25. The upper end of the writing brush 31 is housed in the tube body 21. The lower side from the upper end passes through the inside of the sleeve 24, further passes through the inside of the tip end 23a of the elastic tube 23 and projects outward. The thick diameter part of the writing brush 31 contacts the tip end 23a of the elastic tube 23. At the contact position, the tip end 23a holds and bundles the writing brush 31. Here, the writing brush 31 also includes a brush.

Although the coil spring 25 has different actions and effects to be achieved from the coil spring 5 of the first embodiment, the configuration is similar.

Specifically, the coil spring 25 is a compression coil spring made of, for example, SUS. The coil spring 25 is disposed so as to surround the writing brush 31 and the sleeve 24, which are components constituting the cosmetic container 200.

This coil spring 25 is an integrally molded product in which a lower half portion 25b is integrally continuous with an upper half portion 25a via a stepped part 25d. The upper half portion 25a has a large winding wire diameter. The lower half portion 25b has a small winding wire diameter. Here, the upper half portion, which has a large winding wire diameter, is configured as a first coil spring (a first spring part) 25a and the lower half portion, which has a small winding wire diameter, is configured as a second coil spring (a second spring part) 25b.

Here, as described above, the winding pitch of the first coil spring 25a with a large winding wire diameter is configured to be larger than the winding pitch of the second coil spring 25b with small winding wire diameter. Accordingly, the spring constant of the first coil spring 25a with a large winding wire diameter is configured to be larger than the spring constant of the second coil spring 25b with small winding wire diameter.

At a part close to the stepped part 25d at the first coil spring 25a, which has the large winding wire diameter, an annular-shaped concave part 25e is formed. A lock part 25c is formed between an end part at the stepped part 25d side of the second coil spring 25b with the small winding wire diameter and the concave part 25e of the first coil spring 25a with the large winding wire diameter. The lock part 25c locks the flange part 24c of the sleeve 24 in the axial direction.

The coil spring 25 thus constituted is arranged so as to wind around the sleeve 24. Therefore, the lock part 25c of the coil spring 25 is opposed to (abuts on) the respective lower side surface and upper side surface of the flange part 24c of the sleeve 24 in the axial direction. Accordingly, the lock part 25c of the coil spring 25 is locked with respect to the flange part 24c of the sleeve 24 in the axial direction.

This coil spring 25 is sandwiched between the top end surface of the elastic tube 23 and the lower end surface of the shaft body plate 39. In an initial state where the pressing by the knock operation is released, both the first coil spring 25a and the second coil spring 25b accumulate resilient force. Both ends of the coil spring 25 are not secured to the shaft body plate 39 and the elastic tube 23 here; however, both ends may be secured.

As illustrated in FIG. 6, the grip part 18 of the cosmetic material applicator 50 is mounted to the opening neck part 14 of the container main body 11 by screwing the screws 15 and 20 (the grip part 18 is tightened). Then, the tube body 21 and the shaft body 22 enter into the housing part 13 of the container main body 11 through a tube hole of the middle plug part 16. Thus, the tip end side of the tube body 21 and the tip end side of the writing brush 31 are dipped into the liquid cosmetic material L.

According to the thus constituted cosmetic container 200, in use of the cosmetic material applicator 50, the user grips and rotates the grip part 18 from the state illustrated in FIG. 6. This releases and pulls the screws 15 and 20 upward at the same time, thus removing the cosmetic material applicator 50 from the container main body 11.

In this state (the state illustrated in FIG. 7), the liquid cosmetic material L attached to the writing brush 31 is applied on the application target part. This allows drawing thin lines with the tip end of the writing brush 31 in a state where the thick diameter part, which is at the tip end side of the writing brush 31, is bundled at the tip end 23a of the elastic tube 23. This application aspect is referred to as a first application aspect.

Here, to draw thick lines as another application aspect different from the first application aspect, the knock operation is performed on the operating unit 40 (see FIG. 8). Then, the advancing-retreating lock mechanism 41 acts and this moves the shaft body 22 forward, thus moving the writing brush 31 forward together with the shaft body 22. Simultaneously with this, force of forward movement by the shaft body 22 (the pressing force) is transmitted to the sleeve 24 via the first coil spring 25a, which is disposed between the shaft body 22 and the flange part 24c of the sleeve 24 and has a large spring constant. The sleeve 24 moves forward while compressing the second coil spring 25b, which is disposed between the flange part 24c of the sleeve 24 and the elastic tube 23 and has a small spring constant.

The tip end part 24a of the sleeve 24 reaches the tip end 23a of the elastic tube 23, expands the tip end 23a to widen the opening, and passes through the tip end 23a. While sliding in contact with the tip end 23a, the tip end part 24a projects outward and positions between the tip end 23a of the elastic tube 23 and the writing brush. That is, the writing brush 31 moves forward together with the sleeve 24. At this time, the tip end part 24a of the sleeve 24 is interposed between the tip end 23a of the elastic tube 23, which bundles the writing brush 31, and the writing brush 31. The sleeve 24 protects the forward moving writing brush 31. Accordingly, the tip end 23a of the elastic tube 23 prevents the writing brush 31 from being rolled and fallen apart (see FIG. 9).

When the compression of the second coil spring 25b, which has the small spring constant, nearly comes to an end, the first coil spring 25a, which has the large spring constant, then compresses to move only the writing brush 31 forward. Thus, the thick diameter part of the writing brush 31 projects outward at the predetermined length. Accordingly, drawing thick lines mainly using the part other than the tip end of the writing brush 31 is possible (see FIG. 9).

Thus, this embodiment configures one spring, the coil spring 25, where the first coil spring 25a and the second coil spring 25b whose winding wire diameters and spring constants differ from one another are continuously and integrally formed via the stepped part 25d. Accordingly, the use of the first coil spring 25a and the second coil spring 25b allows achieving sequential movements of the writing brush 31 and the sleeve 24, which are components constituting the cosmetic container 200, also allowing providing wide variety of functions with one spring.

Specifically, to transition from the first application aspect to another application aspect, moving the shaft body 22 forward moves the writing brush 31 forward. At the same time, the sleeve 24 moves forward while compressing the second coil spring 25b, which is disposed between the flange part 24c of the sleeve 24 and the elastic tube 23 and has the small spring constant. When the compression of the second coil spring 25b with the small spring constant nearly comes to an end, the first coil spring 25a, which has the large spring constant, compresses, and only the writing brush 31 moves forward. Thus, the one coil spring 25 can achieve sequential movements of the sleeve 24 and the writing brush 31. That is, the one coil spring 25 can provide wide variety functions.

Alternatively, to transition to another application aspect, when the writing brush 31 and the sleeve 24 move forward, the tip end part 24a of the sleeve 24 is interposed between the tip end 23a of the elastic tube 23, which bundles the writing brush 31, and the writing brush 31. Accordingly, the sleeve 24 can protect the advancing writing brush 31, the tip end 23a of the elastic tube 23 can prevent the writing brush 31 from being rolled and fallen apart.

Alternatively, in the first application aspect, the tip end of the writing brush 31 projects outward from the container. Accordingly, the use of the tip end of the writing brush 31 allows thin applications. In another application aspect, since the writing brush 31 further projects outward, by mainly using the part other than the tip end of the writing brush 31, thick application can be made.

In this embodiment, the use of the stepped part 25d allows easily locking a component constituting the cosmetic container. Specifically, the lock part 25c is formed between the end part at the stepped part 25d side of the second coil spring 25b, which has the small winding wire diameter, and the concave part 25e of the first coil spring 25a, which has the large winding wire diameter. The lock part 25c locks the flange part 24c of the sleeve 24 in the axial direction. This lock part 25c allows easily locking the coil spring 25 to the sleeve 24.

Further, the coil spring of the present invention functions to absorb an impact in the first embodiment while the coil spring functions to achieve the sequential movements of components in the second embodiment. Since the functions differ depending on the application target, in this respect as well, wide variety of functions can be provided.

Although the present invention has been specifically described on the basis of its embodiments; however, the present invention is not limited to the above embodiments. For example, it is only necessary that the male screw and the female screw work similar to a screw thread like a group of projections intermittently disposed or a group of projections spirally and intermittently disposed. Alternatively, the screw projections may be a continuous screw thread.

Insofar as the coil springs 5 and 25 function similar to the first and the second embodiments, the large diameter and the small diameter of the coil springs 5 and 25 may be the opposite.

What is claimed is:

1. A cosmetic container, comprising:
   a tubular-shaped container with a front portion of the container and a rear portion of the container, the rear portion of the container being mounted rotatable with respect to the front portion of the container around an axis line and immovable in an axial direction;
   a movable body with a male screw at an outer peripheral part, the movable body being unrotatable around the axis line and movable in the axial direction with respect to the front portion of the container, the movable body supporting a rod-shaped cosmetic material at a tip end;
   a female screw member with a female screw at an inner peripheral part, the female screw member being unrotatable with respect to the rear portion of the container around the axis line, the female screw being screwed with the male screw; and
   a coil spring for cosmetic material comprising a first spring part and a second spring part that are integrally formed extending along an axial direction, the first spring part and the second spring part having different spring constants, wherein:
   the first spring part and the second spring part have different winding wire diameters,
   the first spring part and the second spring part are continuous via a stepped part,
   the male screw and the female screw constitute a screw part, the screw part acts by relative rotation of the front portion of the container and the rear portion of the container, the relative rotation advances and retreats the movable body to cause the rod-shaped cosmetic material to appear and disappear from an opening at a tip end of the container,
   the female screw member is movable in the axial direction,
   any one of the first spring part or the second spring part of the coil spring for cosmetic material is configured to restrict movement in one direction of the axial direction of the female screw member, and
   another of the first spring part or the second spring part is configured to restrict movement in another direction of the axial direction of the female screw member.

2. A cosmetic container, comprising:
   a tube body with an opening at a tip end;
   a shaft body that can advance and retreat in an axial direction inside the tube body;
   an elastic tube disposed at a tip end of the tube body;
   a tubular sleeve housed in the tube body and the elastic tube, the tubular sleeve that can advance and retreat in the axial direction, the sleeve including a tip end part and a lock part, the tip end part being positioned in the elastic tube, the lock part being disposed at an outer surface rear side with respect to the tip end part;
   a writing brush disposed at a tip end of the shaft body, the writing brush passing an inside of the sleeve and an inside of the elastic tube, contacting a tip end of the elastic tube, and then projecting outward; and
   the coil spring for cosmetic material comprising a first spring part and a second spring part that are integrally formed extending along an axial direction, the first spring part and the second spring part having different spring constants, wherein:
   the first spring part and the second spring part have different winding wire diameters, the first spring part and the second spring part are continuous via a stepped part,
   one of said first or second spring parts with a large spring constant is compressed between the shaft body and the lock part of the sleeve,
   the other of said first or second spring parts with a small spring constant is compressed between the lock part of the sleeve and the elastic tube, and
   the tip end part projects outward while sliding in contact with the tip end of the elastic tube when the tip end part of the sleeve moves forward.

3. A cosmetic container, comprising:
   a tubular-shaped container with a front portion of the container and a rear portion of the container, the rear portion of the container being mounted rotatable with respect to the front portion of the container around an axis line and immovable in an axial direction;

a movable body with a male screw at an outer peripheral part, the movable body being unrotatable around the axis line and movable in the axial direction with respect to the front portion of the container, the movable body supporting a rod-shaped cosmetic material at a tip end;

a female screw member with a female screw at an inner peripheral part, the female screw member being unrotatable with respect to the rear portion of the container around the axis line, the female screw being screwed with the male screw; and a coil spring for cosmetic material comprising a first spring part and a second spring part that are integrally formed extending along an axial direction, the first spring part and the second spring part having different spring constants, wherein:

the first spring part and the second spring part have different winding wire diameters, the first spring part and the second spring part are continuous via a stepped part, the first spring part and the second spring part are arranged so as to surround a component constituting the cosmetic container, a concave part is formed at a part close to a stepped part on one of said first or second spring parts, the concave part having a winding wire diameter which is smaller than that of the one of said first or second spring parts, a lock is formed between an end part at the stepped part of the other of said first or second spring parts and the concave part, and the lock is configured to lock a convex part disposed at an outer peripheral surface of the component in an axial direction, the male screw and the female screw constitute a screw part, the screw part acts by relative rotation of the front portion of the container and the rear portion of the container, the relative rotation advances and retreats the movable body to cause the rod-shaped cosmetic material to appear and disappear from an opening at a tip end of the container, the female screw member is movable in the axial direction, any one of the first spring part or the second spring part of the coil spring for cosmetic material is configured to restrict movement in one direction of the axial direction of the female screw member, and another of the first spring part or the second spring part is configured to restrict movement in another direction of the axial direction of the female screw member.

4. A cosmetic container, comprising:

a tubular-shaped container with a front portion of the container and a rear portion of the container, the rear portion of the container being mounted rotatable with respect to the front portion of the container around an axis line and immovable in an axial direction;

a movable body with a male screw at an outer peripheral part, the movable body being unrotatable around the axis line and movable in the axial direction with respect to the front portion of the container, the movable body supporting a rod-shaped cosmetic material at a tip end;

a female screw member with a female screw at an inner peripheral part, the female screw member being unrotatable with respect to the rear portion of the container around the axis line, the female screw being screwed with the male screw; and a coil spring for cosmetic material comprising a first spring part and a second spring part that are integrally formed extending along an axial direction, the first spring part and the second spring part having different spring constants, wherein:

the first spring part and the second spring part have different winding wire diameters, the first spring part and the second spring part are continuous via a stepped part, a spring constant of the one of said first or second spring parts with a large winding wire diameter is larger than a spring constant of the other of said first or second spring parts with a small winding wire diameter by configuring a winding pitch of the one spring part with the large winding wire diameter larger than a winding pitch of the other spring part with the small winding wire diameter, the male screw and the female screw constitute a screw part, the screw part acts by relative rotation of the front portion of the container and the rear portion of the container, the relative rotation advances and retreats the movable body to cause the rod-shaped cosmetic material to appear and disappear from an opening at a tip end of the container, the female screw member is movable in the axial direction, any one of the first spring part or the second spring part of the coil spring for cosmetic material is configured to restrict movement in one direction of the axial direction of the female screw member, and another of the first spring part or the second spring part is configured to restrict movement in another direction of the axial direction of the female screw member.

5. A cosmetic container, comprising:

a tubular-shaped container with a front portion of the container and a rear portion of the container, the rear portion of the container being mounted rotatable with respect to the front portion of the container around an axis line and immovable in an axial direction;

a movable body with a male screw at an outer peripheral part, the movable body being unrotatable around the axis line and movable in the axial direction with respect to the front portion of the container, the movable body supporting a rod-shaped cosmetic material at a tip end;

a female screw member with a female screw at an inner peripheral part, the female screw member being unrotatable with respect to the rear portion of the container around the axis line, the female screw being screwed with the male screw; and a coil spring for cosmetic material comprising a first spring part and a second spring part that are integrally formed extending along an axial direction, the first spring part and the second spring part having different spring constants, wherein:

the first spring part and the second spring part have different winding wire diameters, the first spring part and the second spring part are continuous via a stepped part, the first spring part and the second spring part are arranged so as to surround a component constituting the cosmetic container, a concave part is formed at a part close to a stepped part on one of said first or second spring parts, the concave part having a winding wire diameter which is smaller than that of the one of said first or second spring parts, a lock is formed between an end part at the stepped part of the other of said first or second spring parts and the concave part, and the lock is configured to lock a convex part disposed at an outer peripheral surface of the component in an axial direction, a spring constant of one of said first or second spring parts with a large winding wire diameter is larger than a spring constant of the other of said first or second spring parts with a small winding wire diameter by configuring a winding pitch of the one spring part with the large winding wire diameter larger than a winding pitch of the other spring part with the small winding wire diameter, the male screw and the female screw constitute a screw part, the screw part acts by relative rotation of the front portion of the container and the rear portion of the container, the relative rotation advances and retreats the movable body to cause the rod-shaped cosmetic material to appear and disappear from an opening at a tip end of the container, the female screw member is movable in the axial direction, any one of the first spring part or the second spring part of the coil spring for cosmetic material is configured to restrict movement in one direction of the axial direction of the female screw member, and another of the first spring part or the second spring part is configured to restrict movement in another direction of the axial direction of the female screw member.

6. A cosmetic container, comprising:

a tube body with an opening at a tip end;

a shaft body that can advance and retreat in an axial direction inside the tube body;

an elastic tube disposed at a tip end of the tube body;

a tubular sleeve housed in the tube body and the elastic tube, the tubular sleeve that can advance and retreat in the axial direction, the sleeve including a tip end part and a lock part, the tip end part being positioned in the elastic tube, the lock part being disposed at an outer surface rear side with respect to the tip end part;

a writing brush disposed at a tip end of the shaft body, the writing brush passing an inside of the sleeve and an inside of the elastic tube, contacting a tip end of the elastic tube, and then projecting outward; and the coil spring for cosmetic material comprising a first spring part and a second spring part that are integrally formed extending along an axial direction, the first spring part and the second spring part having different spring constants, wherein:

the first spring part and the second spring part have different winding wire diameters, the first spring part and the second spring part are continuous via a stepped part, the first spring part and the second spring part are arranged so as to surround a component constituting the cosmetic container, a concave part is formed at a part close to a stepped part on one of said first or second spring parts, the concave part having a winding wire diameter which is smaller than that of the one of said first or second spring parts, a lock is formed between an end part at the stepped part of the other of said first or second spring parts and the concave part, and the lock is configured to lock a convex part disposed at an outer peripheral surface of the component in an axial direction, the one of said first or second spring parts with a large spring constant is compressed between the shaft body and the lock part of the sleeve, the other of said first or second spring parts with a small spring constant is compressed between the lock part of the sleeve and the elastic tube, and the tip end part projects outward while sliding in contact with the tip end of the elastic tube when the tip end part of the sleeve moves forward.

7. A cosmetic container, comprising:

a tube body with an opening at a tip end;

a shaft body that can advance and retreat in an axial direction inside the tube body;

an elastic tube disposed at a tip end of the tube body;

a tubular sleeve housed in the tube body and the elastic tube, the tubular sleeve that can advance and retreat in the axial direction, the sleeve including a tip end part and a lock part, the tip end part being positioned in the elastic tube, the lock part being disposed at an outer surface rear side with respect to the tip end part;

a writing brush disposed at a tip end of the shaft body, the writing brush passing an inside of the sleeve and an inside of the elastic tube, contacting a tip end of the elastic tube, and then projecting outward; and the coil spring for cosmetic material comprising a first spring part and a second spring part that are integrally formed extending along an axial direction, the first spring part and the second spring part having different spring constants, wherein:

the first spring part and the second spring part have different winding wire diameters, the first spring part and the second spring part are continuous via a stepped part, a spring constant of one of said first or second spring parts with a large winding wire diameter is larger than a spring constant of the other of said first or second spring parts with a small winding wire diameter by configuring a winding pitch of the one spring part with the large winding wire diameter larger than a winding pitch of the other spring part with the small winding wire diameter, the one of said first or second spring parts with the large spring constant is compressed between the shaft body and the lock part of the sleeve, the other of said first or second spring parts with the small spring constant is compressed between the lock part of the sleeve and the elastic tube, and the tip end part projects outward while sliding in contact with the tip end of the elastic tube when the tip end part of the sleeve moves forward.

8. A cosmetic container, comprising:

a tube body with an opening at a tip end;

a shaft body that can advance and retreat in an axial direction inside the tube body;

an elastic tube disposed at a tip end of the tube body;

a tubular sleeve housed in the tube body and the elastic tube, the tubular sleeve that can advance and retreat in the axial direction, the sleeve including a tip end part and a lock part, the tip end part being positioned in the elastic tube, the lock part being disposed at an outer surface rear side with respect to the tip end part;

a writing brush disposed at a tip end of the shaft body, the writing brush passing an inside of the sleeve and an inside of the elastic tube, contacting a tip end of the elastic tube, and then projecting outward; and the coil spring for cosmetic material comprising a first spring part and a second spring part that are integrally formed extending along an axial direction, the first spring part and the second spring part having different spring constants, wherein:

the first spring part and the second spring part have different winding wire diameters, the first spring part and the second spring part are continuous via a stepped part, the first spring part and the second spring part are arranged so as to surround a component constituting the cosmetic container, a concave part is formed at a part close to a stepped part on one of said first or second spring parts, the concave part having a winding wire diameter which is smaller than that of the one of said first or second spring parts, a lock is formed between an end part at the stepped part of the other of said first or second spring parts and the concave part of the one on said first or second spring parts, and the lock is configured to lock a convex part disposed at an outer peripheral surface of the component in an axial direction, a spring constant of the one of said first or second spring parts with a large winding wire diameter is larger than a spring constant of the other of said first or second spring parts with a small winding wire diameter by configuring a winding pitch of the one spring part with the large winding wire diameter larger than a winding pitch of the other spring part with the small winding wire diameter, the one of said first or second spring parts with the large spring constant is compressed between the shaft body and the lock part of the sleeve, the other of said first or second spring parts with the small spring constant is compressed between the lock part of the sleeve and the elastic tube, and the tip end part projects outward while sliding in contact with the tip end of the elastic tube when the tip end part of the sleeve moves forward.

\* \* \* \* \*